US012630711B2

(12) United States Patent
Chang et al.

(10) Patent No.: US 12,630,711 B2
(45) Date of Patent: May 19, 2026

(54) LIGHT TRANSMISSIVE MOLDED ARTICLE AND INTERIOR PART OF AUTOMOBILE

(71) Applicants: HYUNDAI MOBIS CO., LTD., Seoul (KR); LG CHEM, LTD., Seoul (KR)

(72) Inventors: Jae Joon Chang, Yongin-si (KR); Moo Seok Lee, Iksan-si (KP); Myeung Il Kim, Iksan-si (KR); Soo Min Lee, Iksan-si (KR); Young Min Kim, Iksan-si (KR)

(73) Assignees: HYUNDAI MOBIS CO., LTD., Seoul (KR); LG CHEM, LTD., Seoul (KR)

( * ) Notice: Subject to any disclaimer, the term of this patent is extended or adjusted under 35 U.S.C. 154(b) by 0 days.

(21) Appl. No.: 17/368,774

(22) Filed: Jul. 6, 2021

(65) Prior Publication Data

US 2022/0010130 A1 Jan. 13, 2022

(30) Foreign Application Priority Data

Jul. 7, 2020 (KR) ........................ 10-2020-0083667

(51) Int. Cl.

| | |
|---|---|
| ***C08L 69/00*** | (2006.01) |
| ***B29C 45/00*** | (2006.01) |
| *B29K 69/00* | (2006.01) |
| *B29L 31/30* | (2006.01) |

(52) U.S. Cl.

CPC .......... *C08L 69/00* (2013.01); *B29C 45/0001* (2013.01); *B29C 45/0053* (2013.01); *B29C 2045/0079* (2013.01); *B29K 2069/00* (2013.01); *B29L 2031/3005* (2013.01)

(58) Field of Classification Search

CPC .......... C08L 69/00; C08L 33/08; C08L 83/10; B29L 2031/3005

See application file for complete search history.

(56) References Cited

U.S. PATENT DOCUMENTS

| | | | | |
|---|---|---|---|---|
| 4,683,169 A * | 7/1987 | Curry | C08J 7/0427 | 428/522 |
| 2008/0103267 A1* | 5/2008 | Hurst | C08L 69/00 | 525/464 |
| 2011/0281995 A1* | 11/2011 | Ha | C08L 83/10 | 524/506 |
| 2016/0145187 A1* | 5/2016 | Bahn | C08G 77/448 | 560/67 |
| 2016/0326312 A1* | 11/2016 | Park | C08G 64/38 | |
| 2018/0079928 A1* | 3/2018 | Maslow | C09D 171/02 | |
| 2019/0225797 A1* | 7/2019 | Martinez Canovas | B29C 45/0001 | |

FOREIGN PATENT DOCUMENTS

| | | | |
|---|---|---|---|
| CN | 105899611 | | 8/2016 |
| CN | 106103589 | | 11/2016 |
| EP | 3 127 964 | | 2/2017 |
| EP | 3 162 853 | | 5/2017 |
| JP | 2001354863 | A * | 12/2001 |
| KR | 10-2008-0009553 | | 1/2008 |
| KR | 20090080057 | A | 7/2009 |
| KR | 2011-0126425 | A | 11/2011 |
| KR | 2015-0003677 | A | 1/2015 |

OTHER PUBLICATIONS

Machine translation of JP-2001354863-A, retrieved Feb. 5, 2023. (Year: 2001).*

English Language Abstract of CN 105899611 published Aug. 24, 2016.

English Language Abstract of CN 106103589 published Nov. 9, 2016.

Chinese Office Action dated Oct. 9, 2022 issued in CN 2021107695961.

Office Action dated Jun. 20, 2025 issued in Korean Application No. 10-2020-0083667.

Notice of Allowance dated Feb. 9, 2026 issued in Korean Application No. 10-2020-0083667.

* cited by examiner

*Primary Examiner* — Callie E Shosho

*Assistant Examiner* — Krupa Shukla

(74) *Attorney, Agent, or Firm* — DLA PIPER LLP US

(57) ABSTRACT

The present disclosure relates to a light transmissive molded article including a base layer molded from a thermoplastic resin composition and a coating layer formed on at least one surface of the base layer, wherein peak energy $PE_A$ is equal to or greater than 40 J when impact energy of 140 J is applied with a rod having a diameter of 12.7 mm and a thickness of 3.0 mm by ASTM D3763, wherein, when being exposed at 90° C. for 500 hours, a color difference $\Delta E_1$ based on color coordinates ($L^*_0$, $a^*_0$, $b^*_0$) of a CIE LAB color space before the exposure and color coordinates ($L^*_A$, $a^*_A$, $b^*_A$) of the CIE LAB color space after the exposure satisfies Equation 1 below, and light transmittance $T_0$ before the exposure and light transmittance $T_A$ after the exposure satisfy Equation 2 below:

$$\Delta E_1 \leq 2.0 \quad \text{[Equation 1]}$$

$$0.95 \leq T_A/T_0 \leq 1.05. \quad \text{[Equation 2]}$$

9 Claims, No Drawings

LIGHT TRANSMISSIVE MOLDED ARTICLE AND INTERIOR PART OF AUTOMOBILE

CROSS-REFERENCE TO RELATED APPLICATION

This application claims the benefit of priority to Korean Patent Application No. 10-2020-0083667, filed in the Korean Intellectual Property Office on Jul. 7, 2020, the entire contents of which are incorporated herein by reference.

TECHNICAL FIELD

The present disclosure relates to a light transmissive molded article, and more particularly, to a light transmissive molded article for an interior part of an automobile, particularly, for an interior part of the automobile including a high-gloss coating layer.

BACKGROUND

Recently, an automobile industry is developing day by day. Accordingly, aesthetic demands for automobile drivetrains as well as exterior and interior parts are increasing. In particular, among the interior parts of the automobile, an interior part of the automobile such as an instrument panel, an audio panel, a gear shift panel, and the like installed around a driver's seat and a passenger's seat are continuously used by a passenger, so that durability and aesthetics are required at the same time.

Specifically, following a recent design diversification and upgrading strategy, a button itself is also required to display information by backlight, and the instrument panel, the audio panel, the gear shift panel, and the like are being integrated with the button. Thus, durability as well as a light transmitting property are required at the same time for such interior part of the automobile.

However, in the prior art, because it was possible to identify information only with information displayed on an information display device disposed in the automobile separately from the interior part of the automobile, and the button for simple selection and manipulation of various functions of the automobile was sufficient when durability was satisfied, such button has a light non-transmitting property, thereby not being able to satisfy the recently required durability and light transmitting property at the same time. Therefore, a development of a molded article used as the interior part of the automobile that may exhibit the durability and the light transmitting property at the same time is required.

PRIOR ART LITERATURE

Patent Literature (Patent Document 1) KR10-2008-0009553A

SUMMARY

The present disclosure has been made to solve the above-mentioned problems occurring in the prior art while advantages achieved by the prior art are maintained intact.

An aspect of the present disclosure is to simultaneously improve durability while imparting a light transmitting property to an interior part of an automobile, especially an interior part of the automobile, such as an instrument panel, an audio panel, a gear shift panel, and the like.

Another aspect of the present disclosure provides a light transmissive molded article having excellent durability and an interior part of an automobile formed therefrom.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a light transmissive molded article includes a base layer molded from a thermoplastic resin composition and a coating layer formed on at least one surface of the base layer, peak energy $PE_A$ is equal to or greater than 40 J when impact energy of 140 J is applied with a rod having a diameter of 12.7 mm and a thickness of 3.0 mm by ASTM D3763, and, when being exposed at 90° C. for 500 hours, a color difference $\Delta E_1$ based on color coordinates ($L^*_0$, $a^*_0$, $b^*_0$) of a CIE LAB color space before the exposure and color coordinates ($L^*_A$, $a^*_A$, $b^*_A$) of the CIE LAB color space after the exposure satisfies Equation 1 below, and light transmittance $T_0$ before the exposure and light transmittance $T_A$ after the exposure satisfy Equation 2 below:

$$\Delta E_1 \leq 2.0 \quad \text{[Equation 1]}$$

$$0.95 \leq T_A/T_0 \leq 1.05. \quad \text{[Equation 2]}$$

DETAILED DESCRIPTION

Hereinafter, the present disclosure will be described in more detail to help understand the present disclosure.

Terms or words used in the present specification and claims should not be construed as being limited to conventional or dictionary meanings, and should be interpreted as a meaning and concept consistent with the technical idea of the present disclosure based on the principle that the inventor may appropriately define the concept of a term to describe his invention in the best way.

The present disclosure provides a light transmissive molded article. The light transmissive molded article may be a molded article that exhibits a property of transmitting light through the molded article when the light is irradiated by backlight.

According to one embodiment of the present disclosure, the light transmissive molded article may include a base layer molded from a thermoplastic resin composition and a coating layer formed on at least one surface of the base layer, or the light transmissive molded article may be a light transmissive molded article for an interior part of an automobile. Because the automobile varies greatly in temperature and humidity depending on a surrounding environment when traveling or parking, the light transmissive molded article used for the interior part of the automobile requires durability based on a change in the surrounding environment. In addition, because the interior part of the automobile such as an instrument panel, an audio panel, a gear shift panel, and the like is continuously used by a passenger, durability and aesthetics are required at the same time. In other words, in addition to the aesthetics, not only impact resistance, but also heat aging resistance, heat cycle resistance, moisture resistance, heat resistance, and the like are all required at the same time as the durability for the light transmissive molded article for the interior part of the automobile. To satisfy the aesthetics, the coating layer capable of imparting high glossiness or the like to the base layer, which is generally a base of the molded article, may be disposed. However, the coating layer is formed in a shape of covering an entirety of the base layer as a coating liquid containing a pigment, a curing agent, and a thinner is applied to the base layer, and the thinner physically dissolves the base layer to allow the pigment to adhere to the base layer. Therefore, there is a problem in that it is difficult to represent basic physical properties of the base layer itself as it is. Therefore, in the light transmissive molded article, not just durability represented from the basic properties of the base layer, but the aesthetics and the durability of the light transmissive molded article itself, including the base layer and the coating layer, need to be satisfied at the same time.

Accordingly, the light transmissive molded article according to the present disclosure may have peak energy $PE_A$ equal to or greater than 40 J when impact energy of 140 J is applied thereto with a rod having a diameter of 12.7 mm and a thickness of 3.0 mm by ASTM D3763, may have a color difference $\Delta E_1$ based on color coordinates ($L^*_0$, $a^*_0$, $b^*_0$) of a CIE LAB color space before exposure and color coordinates ($L^*_A$, $a^*_A$, $b^*_A$) of the CIE LAB color space after the exposure satisfying Equation 1 below when being exposed at 90° C. for 500 hours, and may have light transmittance $T_0$ before the exposure and light transmittance $T_A$ after the exposure satisfying Equation 2 below.

$$\Delta E_1 \leq 2.0 \quad \text{[Equation 1]}$$

$$0.95 \leq T_A/T_0 \leq 1.05 \quad \text{[Equation 2]}$$

According to one embodiment of the present disclosure, when the impact energy of 140 J is applied with the rod having the diameter of 12.7 mm and the thickness of 3.0 mm by the ASTM D3763, the peak energy $PE_A$ may be an amount of energy up to a moment when the light transmissive molded article is cracked by the impact energy. Specifically, the peak energy $PE_A$ may be measured using Instron's CEAST 9350 at an impact speed of 3.3 m/s and a drop weight of 20 kg.

According to one embodiment of the present disclosure, the peak energy $PE_A$ may be equal to or greater than 40 J, equal to or greater than 42 J, equal to or greater than 44 J, or in a range from 44 J to 100 J. When the peak energy $PE_A$ is less than 40 J, 42 J, or 44 J, there is a problem that the impact resistance for a continuous pressing operation of the passenger is not able to be secured.

In addition, according to one embodiment of the present disclosure, the light transmissive molded article may have the total energy $TE_A$ equal to or greater than 50 J, in a range from 50 J to 140 J, or in a range from 50 J to 100 J when the impact energy of 140 J is applied with the rod having the diameter of 12.7 mm and the thickness of 3.0 mm by the ASTM D3763.

According to one embodiment of the present disclosure, when the impact energy of 140 J is applied with the rod having the diameter of 12.7 mm and the thickness of 3.0 mm by the ASTM D3763, the total energy $TE_A$ may be a total amount of energy from a time point prior to the crack of the light transmissive molded article by the impact energy to a time point after the occurrence of the crack. Specifically, the total energy $TE_A$ may be measured using the Instron's CEAST 9350 at the impact speed of 3.3 m/s and the drop weight of 20 kg.

In addition, according to one embodiment of the present disclosure, peak energy $PE_B$ when the impact energy of 140 J is applied to the base layer with the rod having the diameter of 12.7 mm and the thickness of 3.0 mm by the ASTM D3763 and the peak energy $PE_A$ of the light transmissive molded article may satisfy Equation 3 below.

$$\{(PE_B - PE_A)/PE_B\} * 100 \leq 25. \quad \text{[Equation 3]}$$

According to one embodiment of the present disclosure, the peak energy $PE_B$ when the impact energy of 140 J is applied to the base layer with the rod having the diameter of 12.7 mm and the thickness of 3.0 mm by the ASTM D3763 may be an amount of energy up to a moment when the base layer is cracked by the impact energy. Specifically, the peak energy $PE_B$ may be measured using the Instron's CEAST 9350 at the impact speed of 3.3 m/s and the drop weight of 20 kg.

According to one embodiment of the present disclosure, Equation 3 above is for representing an amount of change in the impact energy of the light transmissive molded article that changes based on the coating layer compared to the impact energy of the base layer, which is a factor for selecting the coating layer when forming the coating layer on at least one surface of the base layer. Within the above range, the impact resistance of the light transmissive molded article is excellent.

According to one embodiment of the present disclosure, the light transmissive molded article may have the color difference $\Delta E_1$ based on the color coordinates ($L^*_0$, $a^*_0$, $b^*_0$) of the CIE LAB color space before the exposure and the color coordinates ($L^*_A$, $a^*_A$, $b^*_A$) of the CIE LAB color space after the exposure when being exposed at 90° C. for 500 hours satisfying Equation 1 below.

$$\Delta E_1 \leq 2.0 \quad \text{[Equation 1]}$$

As a specific example, the color difference $\Delta E_1$ may be for representing an amount of change of the color coordinates ($L^*_A$, $a^*_A$, $b^*_A$) of the CIE LAB color space after the exposure compared to the color coordinates ($L^*_0$, $a^*_0$, $b^*_0$) of the CIE LAB color space before the exposure, or may be calculated by Equation 10 below.

$$\Delta E_1 = \{(L^*_0 - L^*_A)^2 + (a^*_0 - a^*_A)^2 + (b^*_0 - b^*_A)^2\}^{1/2} \quad \text{[Equation 10]}$$

According to one embodiment of the present disclosure, the color difference $\Delta E_1$ of Equation 1 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and the light transmittance $T_A$ after the exposure satisfying Equation 2 below when being exposed at 90° C. for 500 hours.

$$0.95 \leq T_A/T_0 \leq 1.05 \quad \text{[Equation 2]}$$

As a specific example, the $T_A/T_0$ may be for representing an amount of change of the light transmittance $T_A$ after the exposure compared to the light transmittance $T_0$ before the exposure. According to one embodiment of the present disclosure, $T_A/T_0$ in Equation 2 may be in a range from 0.95 to 1.05, in a range from 0.96 to 1.04, or in a range from 0.98 to 1.00.

According to one embodiment of the present disclosure, Equation 1 and Equation 2 above are for representing the durability, in particular, the heat aging resistance of the light transmissive molded article, which is a factor for selecting the coating layer when forming the coating layer on the at least one surface of the base layer. Within the above ranges, even when the light transmissive molded article is exposed to high temperature for a long time, the durability is maintained.

According to one embodiment of the present disclosure, the light transmissive molded article may have a color difference $\Delta E_2$ based on the color coordinates ($L^*_0$, $a^*_0$, $b^*_0$) of the CIE LAB color space before the exposure and color coordinates ($L^*_B$, $a^*_B$, $b^*_B$) of the CIE LAB color space after the exposure satisfying Equation 4 below when being exposed at 110° C. for 300 hours.

$$\Delta E_2 \leq 2.0 \quad \text{[Equation 4]}$$

As a specific example, the color difference $\Delta E_2$ may be for representing an amount of change of the color coordinates ($L^*_B$, $a^*_B$, $b^*_B$) of the CIE LAB color space after the exposure compared to the color coordinates ($L^*_0$, $a^*_0$, $b^*_0$) of the CIE LAB color space before the exposure, or may be calculated by Equation 11 below.

$$\Delta E_2 = \{(L^*_0 - L^*_B)^2 + (a^*_0 - a^*_B)^2 + (b^*_0 - b^*_B)^2\}^{1/2} \quad \text{[Equation 11]}$$

According to one embodiment of the present disclosure, the color difference $\Delta E_2$ of Equation 4 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and light transmittance $T_B$ after the exposure satisfying Equation 5 below when being exposed at 110° C. for 300 hours.

$$0.95 \leq T_B/T_0 \leq 1.05 \quad \text{[Equation 5]}$$

As a specific example, the $T_B/T_0$ may be for representing an amount of change of the light transmittance $T_B$ after the exposure compared to the light transmittance $T_0$ before the exposure. According to one embodiment of the present disclosure, $T_B/T_0$ in Equation 5 may be in a range from 0.95 to 1.05, in a range from 0.96 to 1.04, or in a range from 0.98 to 1.00.

According to one embodiment of the present disclosure, Equation 4 and Equation 5 above are for representing the durability, in particular, the heat resistance of the light transmissive molded article, which is a factor for selecting the coating layer when forming the coating layer on the at least one surface of the base layer. Within the above ranges, even when the light transmissive molded article is exposed to extremely high temperature, the durability is maintained.

According to one embodiment of the present disclosure, the light transmissive molded article may have a color difference $\Delta E_3$ based on the color coordinates ($L^*_0$, $a^*_0$, $b^*_0$) of the CIE LAB color space before the exposure and color coordinates ($L^*_C$, $a^*_C$, $b^*_C$) of the CIE LAB color space after the exposure satisfying Equation 6 below when being exposed at 85° C. and 85% relative humidity for 500 hours.

$$\Delta E_3 \leq 2.0 \quad \text{[Equation 6]}$$

As a specific example, the color difference $\Delta E_3$ may be for representing an amount of change of the color coordinates ($L^*_C$, $a^*_C$, $b^*_C$) of the CIE LAB color space after the exposure compared to the color coordinates ($L^*_0$, $a^*_0$, $b^*_0$) of the CIE LAB color space before the exposure, or may be calculated by Equation 12 below.

$$\Delta E_3 = \{(L^*_0 - L^*_C)^2 + (a^*_0 - a^*_C)^2 + (b^*_0 - b^*_C)^2\}^{1/2} \quad \text{[Equation 12]}$$

According to one embodiment of the present disclosure, the color difference $\Delta E_3$ of Equation 6 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and light transmittance $T_C$ after the exposure satisfying Equation 7 below when being exposed at 85° C. and 85% relative humidity for 500 hours.

$$0.95 \leq T_C/T_0 \leq 1.05 \quad \text{[Equation 7]}$$

As a specific example, the $T_C/T_0$ may be for representing an amount of change of the light transmittance $T_C$ after the exposure compared to the light transmittance $T_0$ before the exposure. According to one embodiment of the present disclosure, $T_C/T_0$ in Equation 7 may be in a range from 0.95 to 1.05, in a range from 0.96 to 1.04, or in a range from 0.98 to 1.00.

According to one embodiment of the present disclosure, Equation 6 and Equation 7 above are for representing the durability, in particular, the heat resistance and the moisture resistance under a harsh condition of the light transmissive molded article, which is a factor for selecting the coating layer when forming the coating layer on the at least one surface of the base layer. Within the above ranges, even when the light transmissive molded article is exposed to high temperature and high humidity, the durability is maintained.

According to one embodiment of the present disclosure, the light transmissive molded article may have a color difference $\Delta E_4$ based on the color coordinates ($L^*_0$, $a^*_0$, $b^*_0$) of the CIE LAB color space before the exposure and color coordinates ($L^*_D$, $a^*_D$, $b^*_D$) of the CIE LAB color space after the exposure satisfying Equation 8 below when being exposed to following steps (S10), (S20), and (S30) three times in a sequential and repeated manner.

(S10) 3 hours at a surface temperature of 110° C., (S20) 3 hours at an ambient temperature of −40° C., and (S30) 7 hours at an ambient temperature of 50° C. and a relative humidity of 90%.

$$\Delta E_4 \leq 2.0 \quad \text{[Equation 8]}$$

As a specific example, the color difference $\Delta E_4$ may be for representing an amount of change of the color coordinates (CD, $a^*_D$, $b^*_0$) of the CIE LAB color space after the exposure compared to the color coordinates ($L^*_0$, $a^*_0$, $b^*_0$) of the CIE LAB color space before the exposure, or may be calculated by Equation 13 below.

$$\Delta E_4 = \{(L^*_0 - L^*_D)^2 + (a^*_0 - a^*_D)^2 + (b^*_0 - b^*_D)^2\}^{1/2} \quad \text{[Equation 13]}$$

According to one embodiment of the present disclosure, the color difference $\Delta E_4$ of Equation 8 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and light transmittance $T_D$ after the exposure satisfying Equation 9 below when being exposed to steps (S10), (S20), and (S30) three times in the sequential and repeated manner.

$$0.95 \leq T_D/T_0 \leq 1.05 \quad \text{[Equation 9]}$$

As a specific example, the $T_D/T_0$ may be for representing an amount of change of the light transmittance $T_D$ after the exposure compared to the light transmittance $T_0$ before the exposure. According to one embodiment of the present disclosure, $T_D/T_0$ in Equation 9 may be in a range from 0.95 to 1.05, in a range from 0.96 to 1.04, or in a range from 0.98 to 1.00.

According to one embodiment of the present disclosure, Equation 8 and Equation 9 above are for representing the durability, in particular, the heat cycle resistance of the light transmissive molded article, which is a factor for selecting the coating layer when forming the coating layer on the at least one surface of the base layer. Within the above ranges, even when the light transmissive molded article is exposed to high temperature, low temperature, and high humidity, the durability is maintained.

According to one embodiment of the present disclosure, the light transmissive molded article may have a color difference $\Delta E_5$ based on the color coordinates ($L^*_0$, $a^*_0$, $b^*_0$) of the CIE LAB color space before the exposure and color coordinates ($L^*_E$, $a^*_E$, $b^*_E$) of the CIE LAB color space after the exposure satisfying Equation 14 below when being exposed at 50° C. and 95% relative humidity for 168 hours.

$$\Delta E_5 \leq 2.0 \quad \text{[Equation 14]}$$

As a specific example, the color difference $\Delta E_5$ may be for representing an amount of change of the color coordinates ($L^*_E$, $a^*_E$, $b^*_E$) of the CIE LAB color space after the exposure compared to the color coordinates ($L^*_0$, $a^*_0$, $b^*_0$) of the CIE LAB color space before the exposure, or may be calculated by Equation 15 below.

$$\Delta E_5 = \{(L^*_0 - L^*_E)^2 + (a^*_0 - a^*_E)^2 + (b^*_0 - b^*_E)^2\}^{1/2} \quad \text{[Equation 15]}$$

According to one embodiment of the present disclosure, the color difference $\Delta E_5$ of Equation 14 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and light transmittance $T_E$ after the exposure satisfying Equation 16 below when being exposed at 50° C. and 95% relative humidity for 168 hours.

$$0.95 \leq T_E/T_0 \leq 1.05 \quad \text{[Equation 16]}$$

As a specific example, the $T_E/T_0$ may be for representing an amount of change of the light transmittance $T_E$ after the exposure compared to the light transmittance $T_0$ before the exposure. According to one embodiment of the present disclosure, $T_E/T_0$ in Equation 16 may be in a range from 0.95 to 1.05, in a range from 0.96 to 1.04, or in a range from 0.98 to 1.00.

According to one embodiment of the present disclosure, Equation 14 and Equation 16 above are for representing the durability, in particular, the moisture resistance of the light transmissive molded article, which is a factor for selecting the coating layer when forming the coating layer on the at least one surface of the base layer. Within the above ranges, even when the light transmissive molded article is exposed to high humidity, the durability is maintained.

According to one embodiment of the present disclosure, the light transmissive molded article may have a color difference $\Delta E_6$ based on the color coordinates ($L^*_0$, $a^*_0$, $b^*_0$) of the CIE LAB color space before the exposure and color coordinates ($L^*_F$, $a^*_F$, $b^*_F$) of the CIE LAB color space after the exposure satisfying Equation 17 below when being exposed to following steps (S40) and (S50) 500 times in a sequential and repeated manner.

(S40) 0.5 hours at an ambient temperature of 85° C., (S50) 0.5 hour at an ambient temperature −40° C.

$$\Delta E_6 \leq 2.0 \quad \text{[Equation 17]}$$

As a specific example, the color difference $\Delta E_6$ may be for representing an amount of change of the color coordinates ($L^{*F}$, $a^*_F$, $b^*_F$) of the CIE LAB color space after the exposure compared to the color coordinates ($L^*_0$, $a^*_0$, $b^*_0$) of the CIE LAB color space before the exposure, or may be calculated by Equation 18 below.

$$\Delta E_6 = \{(L^*_0 - L^*_F)^2 (a^*_0 - a^*_F)^2 + (b^*_0 - b^*_F)^2\}^{1/2} \quad \text{[Equation 18]}$$

According to one embodiment of the present disclosure, the color difference $\Delta E_6$ of Equation 17 may be equal to or lower than 2.0, equal to or lower than 1.5, equal to or below 1.0, or in a range from 0.01 to 0.70.

According to one embodiment of the present disclosure, the light transmissive molded article may have the light transmittance $T_0$ before the exposure and light transmittance $T_F$ after the exposure satisfying Equation 19 below when being exposed to steps (S40) and (S50) 500 times in the sequential and repeated manner.

$$0.95 \leq T_F/T_0 \leq 1.05 \quad \text{[Equation 19]}$$

As a specific example, the $T_F/T_0$ may be for representing an amount of change of the light transmittance $T_F$ after the exposure compared to the light transmittance $T_0$ before the exposure. According to one embodiment of the present disclosure, $T_F/T_0$ in Equation 19 may be in a range from 0.95 to 1.05, in a range from 0.96 to 1.04, or in a range from 0.98 to 1.00.

According to one embodiment of the present disclosure, Equation 17 and Equation 19 above are for representing the durability, in particular, thermal shock resistance of the light transmissive molded article, which is a factor for selecting the coating layer when forming the coating layer on the at least one surface of the base layer. Within the above ranges, even when the light transmissive molded article is repeatedly exposed to high temperature and low temperature for a short time, the durability is maintained.

According to one embodiment of the present disclosure, in addition to the peak energy $PE_A$, the light transmissive molded article may satisfy the color differences $\Delta E_1$, $\Delta E_2$, $\Delta E_3$, $\Delta E_4$, $\Delta E_5$, and $\Delta E_6$ and the change amounts of the light transmittance $T_A/T_0$, $T_B/T_0$, $T_C/T_0$, $T_D/T_0$, $T_E/T_0$, and $T_F/T_0$ separately or simultaneously. In this case, the light transmissive molded article secures the aesthetics by the coating layer and has the excellent durability.

According to one embodiment of the present disclosure, the light transmissive molded article may have the light transmittance $T_0$ before the exposure equal to or higher than 8.5%, in a range from 8.5% to 50.0%, in a ranged from 8.5% to 20.0%, or in a range from 8.5% to 10.0% at a thickness of 1.5 mm under any exposure conditions. Within such range, the light transmissive molded article may exhibit the light transmitting property.

In addition, according to one embodiment of the present disclosure, it may be seen that the light transmittances $T_A$, $T_B$, $T_C$, $T_D$, $T_E$, and $T_F$ after the exposure respectively under the above exposure conditions are equal to or higher than 8.5%, in a range from 8.5% to 50.0%, in a range from 8.5% to 20.0%, or in a range from 8.5% to 10.0% at the thickness of 1.5 mm.

According to one embodiment of the present disclosure, it may be seen that the light transmissive molded article has a specific gravity in a range from 1.17 to 1.23, in a range from 1.17 to 1.20, or in a range from 1.18 to 1.19, measured based on an ASTM D792.

In addition, according to one embodiment of the present disclosure, the light transmissive molded article may have a tensile strength measured at a crosshead speed of 50 mm/min at a thickness of 3.2 mm based on an ASTM D638 equal to or greater than 60 MPa, equal to or greater than 61 MPa, or in a range from 65 MPa to 70 MPa, may have an elongation rate measured at a crosshead speed of 50 mm/min at a thickness of 3.2 mm based on an ASTM D638 equal to or higher than 80%, equal to or higher than 100%, or in a range from 130% to 160%, may have a flexural strength measured at a crosshead speed of 10 mm/min at a thickness of 6.4 mm based on an ASTM D790 equal to or greater than 74 MPa, in a range from 74 MPa to 90 MPa, or in a range from 75 MPa to 85 MPa, and may have a flexural modulus measured at a crosshead speed of 10 mm/min at a thickness of 6.4 mm based on an ASTM D790 equal to or greater than 2,000 MPa, in a range from 2,000 MPa to 3,000 MPa, or in a range from 2,000 MPa to 2,100 MPa.

In addition, according to one embodiment of the present disclosure, the light transmissive molded article may have an impact strength measured at 23° C. for a notched specimen with a 6.4 mm thickness based on an ASTM D256 equal to or higher than 10 $KJ/m^2$, in a range from 30 $KJ/m^2$ to 70 $KJ/m^2$, in a range from 45 $KJ/m^2$ to 50 $KJ/m^2$, or in a range from 60 $KJ/m^2$ to 65 $KJ/m^2$.

In addition, according to one embodiment of the present disclosure, the light transmissive molded article may have a thermal deformation temperature measured by heating at a speed of 120° C./h with a load of 18.6 $kgf/cm^2$ at a thickness of 6.4 mm based on an ASTM D648 equal to or higher than 110° C., in a range from 120° C. to 130° C., in a range from 126° C. to 128° C., or in a range from 121° C. to 123° C.

According to one embodiment of the present disclosure, when the specific gravity, a tensile property, the impact strength, and the thermal deformation temperature of the light transmissive molded article are within the above ranges, the light transmissive molded article has the excellent durability while securing the aesthetics by the coating layer.

In addition, according to one embodiment of the present disclosure, the base layer may have an impact strength measured at 23° C. for the notched specimen with the 6.4 mm thickness based on the ASTM D256 equal to or higher than 700 J/m, in a range from 700 J/m to 800 J/m, or in a range from 700 J/m to 720 J/m, may have a tensile strength measured at the crosshead speed of 50 mm/min at the thickness of 3.2 mm based on the ASTM D638 equal to or greater than 55 MPa, in a range from 55 MPa to 80 MPa, or in a range from 55 MPa to 60 MPa, and may have a thermal deformation temperature measured by the heating at the speed of 120° C./h with the load of 18.6 $kgf/cm^2$ at the thickness of 6.4 mm based on the ASTM D648 equal to or higher than 123° C., in a range from 123° C. to 130° C., or in a range from 124° C. to 126° C. Within such ranges, the durability of the light transmissive molded article may be secured based on the change in the coating layer.

In one example, according to one embodiment of the present disclosure, the thermoplastic resin composition may be a polycarbonate resin composition. As a specific example, the polycarbonate resin composition may contain a polycarbonate resin and a polycarbonate-polysiloxane resin. As a more specific example, the polycarbonate resin composition may be one that does not contain a conjugated diene-based impact modifier containing conjugated diene-based rubber such as butadiene rubber, and an acrylic impact modifier including acrylic rubber such as acrylic rubber. Because the impact modifier has a light non-transmitting property, when the polycarbonate resin composition contains the conjugated diene-based or the acrylic-based impact modifier, the light transmitting property may not be able to be secured. On the other hand, as in the present disclosure, when the polycarbonate resin composition contains the polycarbonate resin and the polycarbonate-polysiloxane resin, the basic properties of the base layer as well as the light transmitting property may be secured.

According to one embodiment of the present disclosure, the polycarbonate resin may include a repeating unit represented by Chemical Formula 1 below.

[Chemical Formula 1]

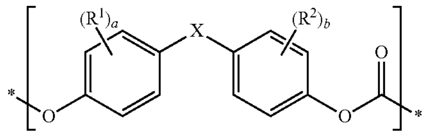

In Chemical Formula 1, each of $R^1$ and $R^2$ may independently represent hydrogen, an alkyl group having 1 to 10 carbon atoms, an alkoxy group having 1 to 10 carbon atoms, or a halogen group. Each of a and b may independently represent an integer selected from 0 to 4. When the a or the b is an integer equal to or higher than 2, the $R^1$ and the $R^2$ may be different from each other. X may be an alkylene group having 1 to 10 carbon atoms unsubstituted or substituted with an alkyl group or a phenyl group having 1 to 10 carbon atoms, a cycloalkylene group having 3 to 15 carbon atoms unsubstituted or substituted with an alkyl group or a phenyl group having 1 to 10 carbon atoms, O, S, SO, $SO_2$, or CO. As a specific example, each of the $R^1$ and the $R^2$ may independently represent the hydrogen, a methyl group, a chloro group, or a bromo group. In addition, as a specific example, the X may be the alkylene group having 1 to 10 carbon atoms unsubstituted or substituted with the alkyl group or the phenyl group having 1 to 10 carbon atoms. As a more specific example, the X may be methylene, ethane-1,1-diyl, propane-2,2-diyl, butane-2,2-diyl, 1-phenylethane-1,1-diyl, or diphenylmethylene. In addition, preferably, X may be cyclohexane-1,1-diyl, O, S, SO, $SO_2$, or CO.

According to one embodiment of the present disclosure, the repeating unit represented by Chemical Formula 1 may be formed by a reaction between an aromatic diol compound and a carbonate precursor. As a specific example, the repeating unit represented by Chemical Formula 1 may be formed by a reaction between the carbonate precursor and the aromatic diol compound, which is at least one selected from a group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane. The reaction may mean a reaction between a hydroxyl group of the aromatic diol compound and the carbonate precursor.

According to one embodiment of the present disclosure, the carbonate precursor may be at least one selected from a group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene, and bishaloformate, and may be the triphosgene or the phosgene as a specific example.

According to one embodiment of the present disclosure, the repeating unit represented by Chemical Formula 1 may be a repeating unit represented by Chemical Formula 1-1 below.

[Chemical Formula 1-1]

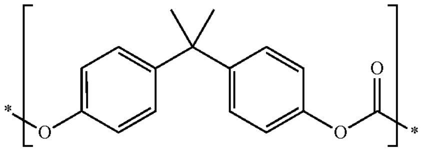

In addition, according to one embodiment of the present disclosure, the polycarbonate resin may have a weight average molecular weight (Mw) in a range from 20,000 g/mol to 80,000 g/mol. In a specific example, the weight average molecular weight (Mw) may be equal to or higher than 20,000 g/mol, equal to or higher than 21,000 g/mol, equal to or higher than 22,000 g/mol, equal to or higher than 23,000 g/mol, equal to or higher than 24,000 g/mol, equal to or higher than 25,000 g/mol, equal to or higher than 26,000 g/mol, equal to or higher than 27,000 g/mol, or equal to or higher than 28,000 g/mol, and may be equal to or lower than 34,000 g/mol, equal to or lower than 33,000 g/mol, or equal to or lower than 32,000 g/mol.

According to one embodiment of the present disclosure, the polycarbonate-polysiloxane resin may be a random copolymer or a block copolymer of polycarbonate and polysiloxane. When the polycarbonate-polysiloxane resin is the random copolymer, the polycarbonate-polysiloxane resin may be obtained by randomly arranging a repeating unit of the polycarbonate and a repeating unit of the polysiloxane arranged with each other. When the polycarbonate-polysiloxane resin is the block copolymer, the polycarbonate-polysiloxane resin may be obtained by coupling a polycarbonate block and a polysiloxane block with each other.

In addition, according to one embodiment of the present disclosure, the polycarbonate-polysiloxane resin may be a copolycarbonate resin including the repeating unit represented by Chemical Formula 1, and a repeating unit represented by Chemical Formula 2 below and/or a repeating unit represented by Chemical Formula 3 below. In a specific example, the polycarbonate-polysiloxane resin may be a copolycarbonate resin including the repeating unit represented by Chemical Formula 1, the repeating unit represented by Chemical Formula 2 below, and the repeating unit represented by Chemical Formula 3 below.

[Chemical Formula 2]

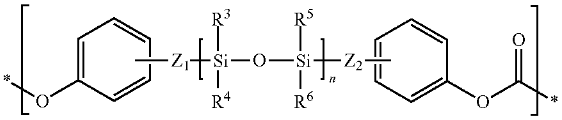

In the Chemical Formula 2, each of $Z_1$ and $Z_2$ may independently represent an alkylene group having 1 to 10 carbon atoms, each of $R^3$ to $R^6$ may independently represent hydrogen, oxiranyl, an alkyl group having 1 to 15 carbon atoms unsubstituted or substituted with an alkoxy group having 1 to 10 carbon atoms substituted with oxiranyl or an aryl group having 6 to 20 carbon atoms, a halogen group, an alkoxy group having 1 to 10 carbon atoms, an allyl group, a haloalkyl group having 1 to 10 carbon atoms, or an aryl group having 6 to 20 carbon atoms, where n may be an integer from 10 to 200.

As a specific example, each of the $Z_1$ and the $Z_2$ may independently represent an alkylene group having 2 to 10 carbon atoms, an alkylene group having 2 to 4 carbon atoms, or propane-1,3-diyl.

In addition, as a specific example, each of the $R^3$ to the $R^6$ may independently represent hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In a more specific example, each of the $R^3$ to the $R^6$ may independently represent an alkyl group having 1 to 10 carbon atoms, an alkyl group having 1 to 6 carbon atoms, an alkyl group having 1 to 3 carbon atoms, or a methyl group.

In addition, as a specific example, n may be an integer equal to or higher than 10, equal to or higher than 15, equal to or higher than 20, equal to or higher than 25, equal to or higher than 30, equal to or higher than 31, or equal to or higher than 32, and equal to or lower than 50, equal to or lower than 45, equal to or lower than 40, equal to or lower than 39, equal to or lower than 38, or equal to or lower than 37.

[Chemical Formula 3]

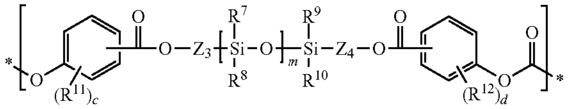

In the Chemical Formula 3, each of $Z_3$ and $Z_4$ may independently represent an alkylene group having 1 to 10 carbon atoms, each of $R^7$ to $R^{10}$ may independently represent hydrogen, oxiranyl, an alkyl group having 1 to 15 carbon atoms unsubstituted or substituted with an alkoxy group having 1 to 10 carbon atoms substituted with oxiranyl or an aryl group having 6 to 20 carbon atoms, a halogen group, an alkoxy group having 1 to 10 carbon atoms, an allyl group, a haloalkyl group having 1 to 10 carbon atoms, or an aryl group having 6 to 20 carbon atoms, and each of $R^{11}$ and $R^{12}$ may independently represent hydrogen, an alkyl group having 1 to 6 carbon atoms, a halogen group, a hydroxyl group, an alkoxy group having 1 to 6 carbon atoms, or an aryl group having 6 to 20 carbon atoms, where m may be an integer in a range from 10 to 200, and each of c and d may independently represent an integer selected from a range from 0 to 4. When the c or the d is integers equal to or higher than 2, the $R^{11}$ and the $R^{12}$ may be different from each other.

As a specific example, each of the $Z_3$ and the $Z_4$ may independently represent an alkylene group having 2 to 10 carbon atoms, an alkylene group having 2 to 6 carbon atoms, or an isobutylene group.

In addition, as a specific example, each of the $R^7$ to the $R^{10}$ may independently represent hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In a more specific example, each of the $R^3$ to the $R^6$ may independently represent the alkyl group having 1 to 10 carbon atoms, the alkyl group having 1 to 6 carbon atoms, the alkyl group having 1 to 3 carbon atoms, or the methyl group.

In addition, as a specific example, m may be an integer equal to or higher than 40, equal to or higher than 45, equal to or higher than 50, equal to or higher than 55, equal to or higher than 56, equal to or higher than 57, or equal to or higher than 58, and equal to or lower than 80, equal to or lower than 75, equal to or lower than 70, equal to or lower than 65, equal to or lower than 64, equal to or lower than 63, or equal to or lower than 62.

In addition, as a specific example, each of the $R^{11}$ and the $R^{12}$ may independently represent the hydrogen.

According to one embodiment of the present disclosure, the repeating units represented by Chemical Formula 2 and Chemical Formula 3 may be those represented by Chemical Formula 2-1 and Chemical Formula 3-1, respectively.

[Chemical Formula 2-1]

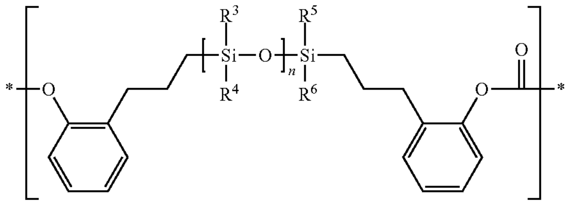

In Chemical Formula 2-1, the $R^3$ to the $R^6$ and the n are as defined in Chemical Formula 2.

[Chemical Formula 3-1]

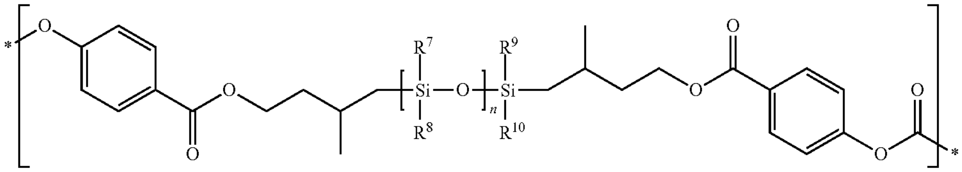

In Chemical Formula 3-1, the $R^7$ to the $R^{10}$ and the m are as defined in Chemical Formula 3.

In addition, according to one embodiment of the present disclosure, the polycarbonate-polysiloxane resin may have a weight average molecular weight (Mw) in a range from 20,000 g/mol to 80,000 g/mol. In a specific example, the weight average molecular weight (Mw) may be equal to or higher than 20,000 g/mol, equal to or higher than 21,000 g/mol, equal to or higher than 22,000 g/mol, equal to or higher than 23,000 g/mol, equal to or higher than 24,000 g/mol, equal to or higher than 25,000 g/mol, equal to or higher than 26,000 g/mol, equal to or higher than 27,000 g/mol, or equal to or higher than 28,000 g/mol. In addition, the weight average molecular weight (Mw) may be equal to or lower than 34,000 g/mol, equal to or lower than 33,000 g/mol, or equal to or lower than 32,000 g/mol.

According to one embodiment of the present disclosure, the polycarbonate-polysiloxane resin may have a molar ratio of 1:0.004 to 0.006 and a weight ratio of 1:0.04 to 0.07 of the repeating unit represented by Chemical Formula 2 and/or Chemical Formula 3 to the repeating unit represented by Chemical Formula 1.

In addition, according to one embodiment of the present disclosure, the polycarbonate resin composition may contain 65 wt % to 85 wt % or 70 wt % to 80 wt % of the polycarbonate resin, and 15 wt % to 35 wt % or 20 wt % to 30 wt % of the polycarbonate-polysiloxane resin. Within such ranges, the durability of the light transmissive molded article may be secured based on the change in the coating layer.

According to one embodiment of the present disclosure, the coating layer is for securing the durability of the light transmissive molded article together with the base layer while securing high glossiness of the light transmissive molded article. The coating layer may be formed by applying the coating liquid to the base layer, and the coating liquid may include the pigment, the curing agent, a solvent, and a main agent.

According to one embodiment of the present disclosure, the pigment may not be particularly limited as long as being able to be used in the coating liquid and be commercially available, and may be contained in the coating liquid in an amount of 0.1 wt % to 10 wt %, 0.5 wt % to 5 wt %, or 1 wt % to 3 wt %.

In addition, according to one embodiment of the present disclosure, the curing agent may not be particularly limited as long as being able to be used in the coating liquid and be commercially available, and may be contained in the coating liquid in an amount of 20 wt % to 50 wt %, 30 wt % to 45 wt %, or 35 wt % to 40 wt %.

In addition, according to one embodiment of the present disclosure, the solvent may not be particularly limited as long as being able to be used in the coating liquid and be commercially available, but may be the thinner in a specific embodiment, and may be contained in the coating liquid in an amount of 1 wt % to 30 wt %, 5 wt % to 20 wt %, or 10 wt % to 15 wt %.

In addition, according to one embodiment of the present disclosure, the main agent may be a paint for securing the high glossiness and the durability from the coating layer, may not be particularly limited as long as being able to be used in the coating liquid and be commercially available, and may be contained in the coating liquid in an amount of 30 wt % to 70 wt %, 40 wt % to 60 wt %, or 45 wt % to 55 wt %.

The present disclosure provides the interior part of the automobile formed with the light transmissive molded article.

According to one embodiment of the present disclosure, the interior part of the automobile may be the instrument panel, the audio panel, or the gear shift panel.

In addition, according to one embodiment of the present disclosure, the interior part of the automobile may be a button-integrated interior part of the automobile integrated with a button for selecting and manipulating various functions of the automobile.

Hereinafter, Examples of the present disclosure will be described in detail such that a person having ordinary knowledge in the technical field to which the present disclosure belongs may easily implement the present disclosure. However, the present disclosure may be embodied in several different forms and may not be limited to the Examples described herein.

Experimental Example 1

Examples and Comparative Examples

Following components were mixed in contents (wt %) described in Table 1, extruded and pelletized, and then injection-molded to prepare thermoplastic resin composition specimens. Impact strength, tensile strength, and thermal deformation temperature of the thermoplastic resin composition specimens were measured by a following method and shown in Table 1.

(A) Polycarbonate resin (PC): a polycarbonate resin having a weight average molecular weight in a range from 20,000 g/mol to 80,000 g/mol including a repeating unit represented by Chemical Formula 1-1 below.

[Chemical Formula 1-1]

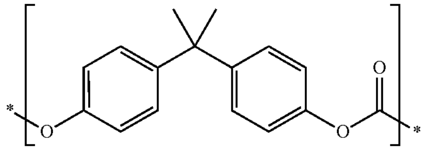

(B) Polycarbonate-polysiloxane resin (Si—PC): a polycarbonate-polysiloxane resin having a weight average molecular weight in a range from 20,000 g/mol to 80,000 g/mol, including repeating units represented by Chemical Formulas 1-1, 2-1, and 3-1 below.

[Chemical Formula 1-1]

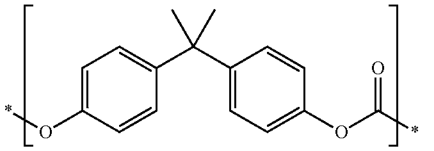

[Chemical Formula 2-1]

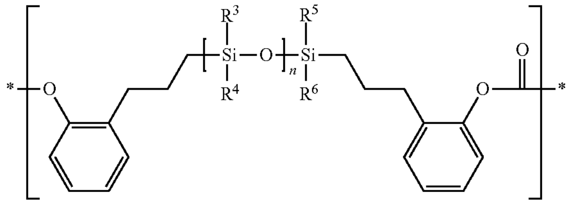

(n is 34, and each of the $R^3$ to the $R^6$ is a methyl group.)

[Chemical Formula 3-1]

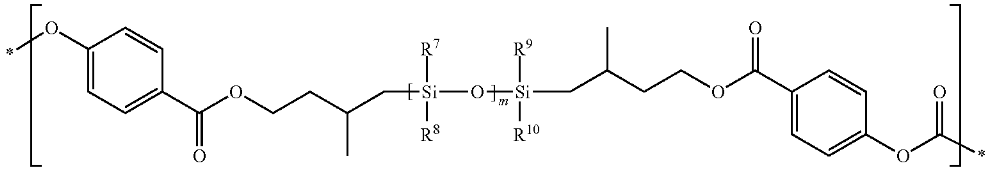

(m is 58, and the $R^7$ to the $R^{10}$ are methyl groups.)

(C) Impact modifier (IM): a butyl acrylate-acrylonitrile-styrene-divinylbenzene copolymer (D) Additive (AD): heat stabilizer, lubricant, and UV stabilizer Izod impact strength (J/m): measured at 23° C. for the notched specimen with the 6.4 mm thickness based on the ASTM D256.

Tensile strength (MPa): measured at the crosshead speed of 50 mm/min at the thickness of 3.2 mm based on the ASTM D638.

Thermal deformation temperature (° C.): measured by the heating at the speed of 120° C./h with the load of 18.6 $kgf/cm^2$ at the thickness of 6.4 mm based on the ASTM D648.

TABLE 1

| Division | | Example | | Comparative Example | | | | | | |
|---|---|---|---|---|---|---|---|---|---|---|
| | | 1 | 2 | 1 | 2 | 3 | 4 | 5 | 6 | 7 |
| Pc | (wt %) | 79.05 | 69.05 | 99.05 | 89.05 | 59.05 | 49.05 | 47.05 | 24.05 | — |
| Si-PC | (wt %) | 20.00 | 30.00 | — | 10.00 | 40.00 | 50.00 | 50.00 | 75.00 | 99.05 |
| Im | (wt %) | — | — | — | — | — | — | 2.00 | — | — |
| Ad | (wt %) | 0.95 | 0.95 | 0.95 | 0.95 | 0.95 | 0.95 | 0.95 | 0.95 | 0.95 |
| Izod impact strength | (J/m) | 720 | 700 | 120 | 200 | 680 | 640 | 580 | 550 | 420 |

TABLE 1-continued

| Division | | Example 1 | Example 2 | Comparative Example 1 | 2 | 3 | 4 | 5 | 6 | 7 |
|---|---|---|---|---|---|---|---|---|---|---|
| Tensile strength | (MPa) | 55 | 55 | 57 | 56 | 54 | 54 | 53 | 52 | 50 |
| Thermal deformation temperature | (° C.) | 126 | 124 | 130 | 127 | 122 | 120 | 118 | 115 | 110 |

As shown in Table 1 above, it may be seen that specimens prepared in Examples 1 and 2 showed excellent impact strength, tensile strength, and thermal deformation temperature, but Comparative Example 1 without the polycarbonate-polysiloxane resin and Comparative Example 2 containing a trace amount of polycarbonate-polysiloxane resin had poor impact strength. It may be seen that, in Comparative Examples 3 and 4 containing an excessive amount of polycarbonate-polysiloxane resin, the impact strength was improved compared to Comparative Example 1, but the tensile strength and the thermal deformation temperature were sharply decreased. It may be seen that, in Comparative Examples 4 and 6 containing the excessive amount of polycarbonate-polysiloxane resin and Comparative Example 7 containing only the polycarbonate-polysiloxane resin, the impact strength was rather decreased, and the tensile strength and the thermal deformation temperature were also decreased. In addition, it may be seen that, in Comparative Example 5 containing the impact modifier with the excessive amount of polycarbonate-polysiloxane resin, the impact strength was rather decreased, and the tensile strength and the thermal deformation temperature were also decreased.

Experimental Example 2

Using each of the thermoplastic resin composition and a PC/ABS alloy resin composition prepared in Example 1 above as the base layer, the coating layer was formed by applying a coating liquid containing 2 wt % of the pigment, 37 wt % of the curing agent, 12 wt % of the thinner, and 49 wt % of the main agent on the base layer to prepare light transmissive molded article specimens. The impact energy of the base layer specimen and the light transmissive molded article specimens were measured using a following method and shown in Table 2 below.

- impact energy (J): when the impact energy of 140 J was applied with the rod having the diameter of 12.7 mm at the impact speed of 3.3 m/s and the drop weight of 20 kg using the Instron's CEAST 9350 at the thickness of 3.0 mm based on the ASTM D3763, the peak energy PE, which is the amount of energy up to the moment when the crack occurs by the impact energy, and the total energy TE, which is the total amount of energy from the time point prior to the crack by the impact energy to the time point after the occurrence of the crack were measured. The peak energy $PE_A$ and the total energy $TE_A$ for the light transmissive molded article specimen and the peak energy $PE_B$ and the total energy $TE_B$ for the base layer specimen were separately described. In addition, an amount of change in the peak energy $\{(PE_B-PE_A)/PE_B\}*100$ was calculated from the peak energy $PE_B$ for the base layer specimen and the peak energy $PE_A$ for the light transmissive molded article specimen, and described together.

TABLE 2

| | | Division: Example 1 | Comparative Example 8 | Comparative Example 9 |
|---|---|---|---|---|
| Type base of layer | | PC resin composition | PC/ABS alloy resin composition | PC/ABS alloy resin composition |
| $Pe_a$ | (j) | 44.6 | 43.2 | 42.3 |
| $Te_a$ | (j) | 50.2 | 58.6 | 57.9 |
| $Pe_b$ | (j) | 58.8 | 46.0 | 43.5 |
| $Te_b$ | (j) | 64.1 | 52.8 | 48.1 |
| Peak energy amount of change | | 24.15 | 6.09 | 2.76 |

As shown in Table 2 above, it may be seen that Example 1 exhibited a high level of impact energy even though a PC resin composition that does not contain an ABS component was used compared to Comparative Examples 8 and 9 using PC/ABS alloy resin compositions.

Experimental Example 3

The specific gravity, the tensile strength, the elongation rate, the flexural strength, the flexural modulus, the izod impact strength, and the thermal deformation temperature were measured for the light transmissive molded article specimens prepared in Experimental Example 2 above using a following method and shown in Table 3.

- Specific gravity: measured based on the ASTM D792.
- Tensile strength (MPa) and elongation rate (%): measured at the crosshead speed of 50 mm/min at the thickness of 3.2 mm based on the ASTM D638.
- Flexural strength (MPa) and flexural modulus (MPa): measured at the crosshead speed of 10 mm/min at the thickness of 6.4 mm based on the ASTM D790.
- Izod impact strength ($KJ/m^2$): measured at 23° C. for the notched specimen with the 6.4 mm thickness based on the ASTM D256.
- Thermal deformation temperature (° C.): measured by the heating at the speed of 120° C./h with the load of 18.6 $kgf/cm^2$ at the thickness of 6.4 mm based on the ASTM D648.

TABLE 3

| | | Division: Example 1 | Comparative Example 8 | Comparative Example 9 |
|---|---|---|---|---|
| Specific gravity | | 1.18 | 1.14 | 1.16 |
| Tensile strength | (mpa) | 65 | 50 | 56 |
| Elongation rate | (%) | 140 | 84 | 128 |

TABLE 3-continued

| | | Division | | |
|---|---|---|---|---|
| | | Example | Comparative Example | |
| | | 1 | 8 | 9 |
| Flexural strength | (mpa) | 80 | 78 | 78 |
| Flexural modulus | (mpa) | 2,010 | 2,200 | 2,040 |
| Izod impact strength | (KJ/m$^2$) | 45 | 45 | 46 |
| Thermal deformation temperature | (° C.) | 126.5 | 111.4 | 114.0 |

As shown in Table 3 above, it may be seen that, even though the PC resin composition that does not contain the ABS component was used compared to Comparative Examples 8 and 9 using the PC/ABS alloy resin compositions, Example 1 exhibited a high level of specific gravity, excellent tensile property and flexural property, and a high thermal deformation temperature while implementing the same level of impact strength.

Experimental Example 4

For the light transmissive molded article specimen prepared from Example 1 with the thickness of 1.5 mm, the light transmissive molded article specimen prepared from Comparative Example 8 with the thickness of 2.0 mm, and the light transmissive molded article specimen prepared from Comparative Example 9 with the thickness of 1.6 mm, which were prepared in Experimental Example 2 above, the amount of change in the light transmittance and the color difference were measured under each condition using a following method and shown in Table 4.

Light transmittance (%): The light transmittance $T_0$ was measured using a haze meter.

Color coordinates and color difference: The color coordinates of the CIE LAB color space were measured using a color difference meter, and the color difference was calculated by measuring the color coordinates of the CIE LAB color space after the exposure for each condition compared to the color coordinates ($L^*_0$, $a^*_0$, $b^*_0$) of the CIE LAB color space before the exposure.

Heat aging resistance: The specimen was exposed at 90° C. for 500 hours, the light transmittance $T_A$ and the color coordinates ($L^*_A$, $a^*_A$, $b^*_A$) after the exposure were measured in the same way as above, and the color difference $\Delta E_1$ and the amount of change in the light transmittance $T_A/T_0$ were calculated. The color difference $\Delta E_1$ was calculated from following Equation 10 below.

$$\Delta E_1=\{(L^*_0-L^*_A)^2+(a^*_0-a^*_A)^2+(b^*_0-b^*_A)^2\}^{1/2} \quad \text{[Equation 10]}$$

heat resistance: The specimen was exposed at 110° C. for 300 hours, the light transmittance $T_B$ and the color coordinates ($L^*_B$, $a^*_B$, $b^*_B$) after the exposure were measured in the same way as above, and the color difference $\Delta E_2$ and the amount of change in the light transmittance $T_B/T_0$ were calculated. The color difference $\Delta E_2$ was calculated from following Equation 11 below.

$$\Delta E_2=\{(L^*_0-L^*_B)^2+(a^*_0-a^*_B)^2+(b^*_0-b^*_B)^2\}^{1/2} \quad \text{[Equation 11]}$$

85/85 test: The specimen was exposed at 85° C. and 85% relative humidity for 500 hours, the light transmittance $T_C$ and the color coordinates ($L^*_C$, $a^*_C$, $b^*_C$) after the exposure were measured in the same way as above, and the color difference $\Delta E_3$ and the amount of change in the light transmittance $T_C/T_0$ were calculated. The color difference $\Delta E_3$ was calculated from following Equation 12 below.

$$\Delta E_3=\{(L^*_0-L^*_C)^2+(a^*_0-a^*_C)^2+(b^*_0-b^*_C)^2\}^{1/2} \quad \text{[Equation 12]}$$

heat cycle resistance: The specimen was exposed to steps (S10), (S20), and (S30) below three times in the sequential and repeated manner, the light transmittance $T_0$ and the color coordinates ($L^*_0$, $a^*_0$, $b^*_0$) after the exposure were measured in the same way as above, and the color difference $\Delta E_4$ and the amount of change in the light transmittance $T_D/T_0$ were calculated. The color difference $\Delta E_4$ was calculated from following Equation 13 below.

(S10) 3 hours at the surface temperature of 110° C., (S20) 3 hours at the ambient temperature of −40° C., and (S30) 7 hours at the ambient temperature of 50° C. and the relative humidity of 90%.

$$\Delta E_4=\{(L^*_0-L^*_D)^2+(a^*_0-a^*_D)^2+(b^*_0-b^*_D)^2\}^{1/2} \quad \text{[Equation 13]}$$

moisture resistance: The specimen was exposed at 50° C. and 95% relative humidity for 168 hours, the light transmittance $T_E$ and the color coordinates ($L^*_E$, $a^*_E$, $b^*_E$) after the exposure were measured in the same way as above, and the color difference $\Delta E_5$ and the amount of change in the light transmittance $T_E/T_0$ were calculated. The color difference $\Delta E_5$ was calculated from following Equation 15 below.

$$\Delta E_5=\{(L^*_0-L^*_E)^2+(a^*_0-a^*_E)^2+(b^*_0-b^*_E)^2\}^{1/2} \quad \text{[Equation 15]}$$

Thermal shock test: The specimen was exposed to steps (S40) and (S50) below 500 times in the sequential and repeated manner, the light transmittance $T_F$ and the color coordinates ($L^*_F$, $a^*_F$, $b^*_F$) after the exposure were measured in the same way as above, and the color difference $\Delta E_6$ and the amount of change in the light transmittance $T_F/T_0$ were calculated. The color difference $\Delta E_6$ was calculated from following Equation 18 below.

(S40) 0.5 hours at the ambient temperature of 85° C., (S50) 0.5 hour at the ambient temperature −40° C.

$$\Delta E_6=\{(L^*_0-L^*_F)^2+(a^*_0-a^*_F)^2+(b^*_0-b^*_F)^2\}^{1/2} \quad \text{[Equation 18]}$$

TABLE 4

| | | Division | | |
|---|---|---|---|---|
| | | Example | Comparative Example | |
| | | 1 | 8 | 9 |
| Light transmittance before exposure(%) | | 8.7 | 6.3 | 20.9 |
| Heat aging resistance | $\Delta e_1$ | 0.52 | 2.67 | 2.30 |
| | $T_A$(%) | 8.7 | 5.8 | 21.3 |
| | $T_A/T_0$ | 1.00 | 0.92 | 1.02 |
| Heat resistance | $\Delta e_2$ | 0.41 | 4.3 | 4.2 |
| | $T_B$(%) | 8.6 | 4.9 | 19.8 |
| | $T_B/T_0$ | 0.99 | 0.78 | 0.95 |
| 85/85 test | $\Delta e_3$ | 0.48 | 2.65 | 3.80 |
| | $T_C$(%) | 8.7 | 5.4 | 20.2 |
| | $T_C/T_0$ | 1.00 | 0.86 | 0.97 |
| Heat cycle resistance | $\Delta e_4$ | 0.35 | 1.9 | 1.94 |
| | $T_D$(%) | 8.6 | 5.2 | 21 |
| | $T_D/T_0$ | 0.99 | 0.83 | 1.00 |
| Moisture resistance | $\Delta e_5$ | 0.18 | 0.19 | 1.9 |
| | $T_E$(%) | 8.7 | 6.4 | 20.9 |
| | $T_E/T_0$ | 1.00 | 1.02 | 1.00 |

TABLE 4-continued

| | | Division | | |
|---|---|---|---|---|
| | | Example | Comparative Example | |
| | | 1 | 8 | 9 |
| Thermal shock test | $\Delta E_6$ | 0.63 | 1.87 | 1.81 |
| | $T_F$(%) | 8.7 | 5.8 | 21.7 |
| | $T_F/T_0$ | 1.00 | 0.92 | 1.04 |

As shown in Table 4 above, it may be seen even from the heat aging resistance, the heat resistance, the 85/85 test, the heat cycle resistance, the moisture resistance, and the thermal shock test that, even though the PC resin composition that does not contain the ABS component was used compared to Comparative Examples 8 and 9 using the PC/ABS alloy resin compositions, Example 1 exhibited very little change in the light transmittance and excellent durability because of low color difference.

From such result, it may be seen that the light transmissive molded article according to the present disclosure has the excellent durability, in particular, the impact resistance, the heat aging resistance, the heat cycle resistance, the moisture resistance, and the heat resistance while exhibiting the light transmitting property, and it may be seen that such light transmissive molded article is suitable as the interior part of the automobile.

The light transmissive molded article according to the present disclosure has the excellent durability while exhibiting the light transmitting property.

The light transmissive molded article according to the present disclosure has the excellent impact resistance, heat aging resistance, heat cycle resistance, moisture resistance, and heat resistance.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure claimed in the following claims.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure claimed in the following claims.

What is claimed is:

1. A light transmissive molded article comprising:

a base layer molded from a thermoplastic resin composition and a coating layer formed on at least one surface of the base layer, wherein the thermoplastic resin composition is formed by a polycarbonate resin and a polycarbonate-polysiloxane resin, wherein the thermoplastic resin composition contains 65 wt % to 85 wt % of the polycarbonate resin and 15 wt % to 35 wt % of the polycarbonate-polysiloxane resin, wherein the polycarbonate-polysiloxane resin consists of a repeating unit represented by Chemical Formula 1, a repeating unit represented by Chemical Formula 2 and a repeating unit represented by Chemical Formula 3, Chemical Formula 1

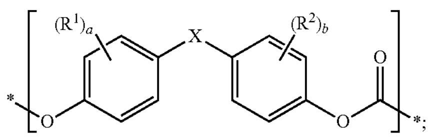

wherein:

$R^1$ and $R^2$ are each independently hydrogen, an alkyl group having 1 to 10 carbon atoms, an alkoxy group having 1 to 10 carbon atoms, or a halogen group, X is an alkylene group having 1 to 10 carbon atoms unsubstituted or substituted with an alkyl group or a phenyl group having 1 to 10 carbon atoms, a cycloalkylene group having 3 to 15 carbon atoms unsubstituted or substituted with an alkyl group or a phenyl group having 1 to 10 carbon atoms, O, S, SO, $SO^2$, or CO, a and b are each independently an integer selected from a range from 0 to 4, Chemical Formula 2

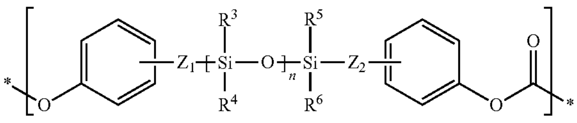

wherein:

$Z^1$ and $Z^2$ are each independently an alkylene group having 1 to 10 carbon atoms, $R^3$ to $R^6$ are each independently hydrogen, oxiranyl, an alkyl group having 1 to 15 carbon atoms unsubstituted or substituted with an alkoxy group having 1 to 10 carbon atoms substituted with oxiranyl or an aryl group having 6 to 20 carbon atoms, a halogen group, an alkoxy group having 1 to 10 carbon atoms, an allyl group, a haloalkyl group having 1 to 10 carbon atoms, or an aryl group having 6 to 20 carbon atoms, n is an integer from 10 to 200;

Chemical Formula 3

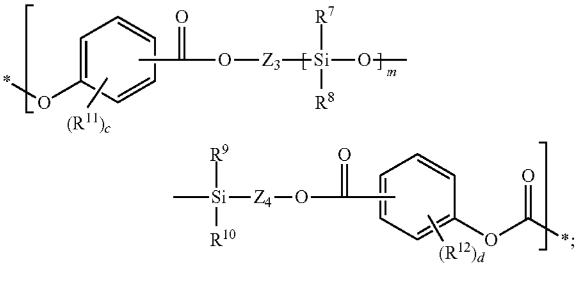

wherein:

$Z_3$ and $Z_4$ are each independently an alkylene group having 1 to 10 carbon atoms, $R^7$ to $R^{10}$ are each independently hydrogen, oxiranyl, an alkyl group having 1 to 15 carbon atoms unsubstituted or substituted with an alkoxy group having 1 to 10 carbon atoms substituted with oxiranyl or an aryl group having 6 to 20 carbon atoms, a halogen group, an alkoxy group having 1 to 10 carbon atoms, an allyl group, a haloalkyl group having 1 to 10 carbon atoms, or an aryl group having 6 to 20 carbon atoms, $R^{11}$ and $R^{12}$ are each independently hydrogen, an alkyl group having 1 to 6 carbon atoms, a halogen group, a hydroxyl group, an alkoxy group having 1 to 6 carbon atoms, or an aryl group having 6 to 20 carbon atoms, m is an integer in a range from 10 to 200, c and d are each independently an integer selected from a range from 0 to 4, when the c or the d is an integer equal to or higher than 2, the $R^{11}$ and the $R^{12}$ are different from each other;

wherein the polycarbonate-polysiloxane resin has a molar ratio of 1:0.004 to 0.006 of the repeating unit represented by Chemical Formula 3 to the repeating unit represented by Chemical Formula 1, and a molar ratio of 1:0.004 to 0.006 of the repeating unit represented by Chemical Formula 2 to the repeating unit represented by Chemical Formula 1, wherein the coating layer is formed by applying a coating liquid to the base layer, the coating liquid comprising: (i) a pigment in an amount of 0.1 wt % to 10 wt %, 0.5 wt % to 5 wt %, or 1 wt % to 3 wt %, (ii) a curing agent in an amount of 20 wt % to 50 wt %, 30 wt % to 45 wt %, or 35 wt % to 40 wt %, (iii) a solvent in an amount of 1 wt % to 30 wt %, 5 wt % to 20 wt %, or 10 wt % to 15 wt %, and (iv) a paint in an amount of 30 wt % to 70 wt %, 40 wt % to 60 wt %, or 45 wt % to 55 wt %, wherein a peak energy $PE_A$ of the light transmissive molded article is equal to or greater than 40 J when an impact energy of 140 J is applied with a rod having a diameter of 12.7 mm and a thickness of 3.0 mm by ASTM D3763, wherein, when being exposed at 90° C. for 500 hours, the light transmissive molded article has a color difference $\Delta E_1$ based on color coordinates ($L^*_0$, $a^*_0$, $b^*_0$) of a CIE LAB color space before the exposure and color coordinates ($L^*_A$, $a^*_A$, $b^*_A$) of the CIE LAB color space after the exposure, wherein the color difference $\Delta E_1$ satisfies the equation $\Delta E1 \leq 2.0$, and wherein light transmittance $T_0$ of the light transmissive molded article before the exposure and light transmittance $T_A$ of the light transmissive molded article after the exposure satisfy the equation $0.95 \leq T_A/T_0 \leq 1.05$.

2. The light transmissive molded article of claim 1, wherein total energy $TE_A$ of the light transmissive molded article is equal to or greater than 50 J when the impact energy of 140 J is applied with the rod having the diameter of 12.7 mm and the thickness of 3.0 mm by the ASTM D3763.

3. The light transmissive molded article of claim 1, wherein a peak energy $PE_B$ of the base layer when the impact energy of 140 J is applied to the base layer with the rod having the diameter of 12.7 mm and the thickness of 3.0 mm by the ASTM D3763 and the peak energy PEA of the light transmissive molded article satisfy the equation $\{(PE_B-PE_A)/PE_B\}*100 \leq 25$.

4. The light transmissive molded article of claim 1, wherein, when being exposed at 110° C. for 300 hours, the light transmissive molded article has a color difference $\Delta E_2$ based on the color coordinates ($L^*_0$, $a^*_0$, $b^*_0$) of the CIE LAB color space before the exposure and color coordinates ($L^*_B$, $a^*_B$, $b^*_B$) of the CIE LAB color space after the exposure, wherein the color difference $\Delta E_2$ satisfies the equation $\Delta E_2 \leq 2.0$, and wherein the light transmittance $T_0$ of the light transmissive molded article before the exposure and light transmittance $T_B$ of the light transmissive molded article after the exposure satisfy the equation $0.95 \leq T_B/T_0 \leq 1.05$.

5. The light transmissive molded article of claim 1, wherein, when being exposed at 85° C. and 85% relative humidity for 500 hours, the light transmissive molded article has a color difference $\Delta E_3$ based on the color coordinates ($L^*_0$, $a^*_0$, $b^*_0$) of the CIE LAB color space before the exposure and color coordinates ($L^*_C$, $a^*_C$, $b^*_C$) of the CIE LAB color space after the exposure, wherein the color difference $\Delta E_3$ satisfies the equation $\Delta E_3 \leq 2.0$, and wherein the light transmittance $T_0$ of the light transmissive molded article before the exposure and light transmittance $T_C$ of the light transmissive molded article after the exposure satisfy the equation $0.95 \leq T_C/T_0 \leq 1.05$.

6. The light transmissive molded article of claim 1, wherein, when being exposed to each of 3 hours at a surface temperature of 110° C., 3 hours at an ambient temperature of −40° C., and 7 hours at an ambient temperature of 50° C. and a relative humidity of 90%, three times in a sequential and repeated manner, the light transmissive molded article has a color difference $\Delta E_4$ based on the color coordinates ($L^*_0$, $a^*_0$, $b^*_0$) of the CIE LAB color space before the exposure and color coordinates ($L^*_D$, $a^*_D$, $b^*_D$) of the CIE LAB color space after the exposure, wherein the color difference $\Delta E_4$ is satisfies the equation $\Delta E_4 \leq 2.0$, and wherein the light transmittance $T_0$ of the light transmissive molded article before the exposure and light transmittance $T_D$ of the light transmissive molded article after the exposure satisfy the equation $0.95 \leq T_D/T_0 \leq 1.05$.

7. The light transmissive molded article of claim 1, wherein the light transmittance $T_0$ of the light transmissive molded article before the exposure is equal to or higher than 8.5% at a thickness of 1.5 mm.

8. The light transmissive molded article of claim 1, wherein the base layer has an impact strength equal to or higher than 700 J/m when measured at 23° C. for a notched specimen with a thickness of 6.4 mm by an ASTM D256, wherein the base layer has a tensile strength equal to or greater than 55 MPa when measured at a crosshead speed of 50 mm/min at a thickness of 3.2 mm by an ASTM D638, wherein the base layer has a thermal deformation temperature equal to or higher than 123° C. when measured by heating at a speed of 120° C./h with a load of 18.6 $kgf/cm^2$ at the thickness of 6.4 mm by an ASTM D648.

9. An interior part of an automobile formed with the light transmissive molded article of claims 1.

* * * * *